United States Patent [19]
Pai

[11] 4,130,874
[45] Dec. 19, 1978

[54] LOAD MANAGEMENT TERMINAL HAVING PLURAL SELECTABLE ADDRESS FORMATS FOR A POWER LINE COMMUNICATION SYSTEM

[75] Inventor: Stephen M. Pai, Raleigh, N.C.

[73] Assignee: Westinghouse Electric Corp., Pittsburgh, Pa.

[21] Appl. No.: 806,252

[22] Filed: Jun. 13, 1977

[51] Int. Cl.² .............................................. H04Q 9/00
[52] U.S. Cl. ................................... 364/514; 364/492; 340/310 A; 307/31
[58] Field of Search ....................... 235/151.21, 151.31; 307/31, 32; 340/310 A, 150; 364/483, 492, 493, 514

[56] References Cited

U.S. PATENT DOCUMENTS

| | | | |
|---|---|---|---|
| 3,619,635 | 11/1971 | Thompson et al. | 307/11 |
| 3,693,155 | 9/1972 | Craften et al. | 340/147 R |
| 3,697,768 | 10/1972 | Johnston | 307/31 |
| 3,702,460 | 11/1972 | Blose | 340/150 |
| 3,751,676 | 8/1973 | Igarashi et al. | 307/31 |
| 3,882,465 | 5/1975 | Cook et al. | 340/147 R |
| 3,911,415 | 10/1975 | Whyte | 340/310 A |
| 3,942,170 | 3/1976 | Whyte | 340/310 A |
| 3,967,264 | 6/1976 | Whyte et al. | 340/310 A |

Primary Examiner—Edward J. Wise
Attorney, Agent, or Firm—R. W. Smith

[57] ABSTRACT

A load management terminal for each of remote electric utility customer locations included in a power line communication system is addressable by alternate codes. A combined unique, selected block and universal block address recognition circuit is alternately responsive to received data addressed to a single terminal or either of two groups of terminals also including the single terminal. An internal address generator produces a plurality of different binary coded bit streams for use as authenticating reference addresses at address comparators in the recognition circuit. Different selected block address circuit configurations are available by connecting a predetermined one of the bit streams to an associated selected block address comparator.

19 Claims, 5 Drawing Figures

LOAD MANAGEMENT TERMINAL HAVING PLURAL SELECTABLE ADDRESS FORMATS FOR A POWER LINE COMMUNICATION SYSTEM

BACKGROUND OF THE INVENTION

This invention generally relates to remote communication terminals for remotely controlling loads and for remotely reading meters of electric utility customers, and more particularly, to an address recognition arrangement for such terminals in which different address code formats are receivable by a discrete terminal, either singly or also simultaneously with either of two different groups of terminals, each including the discrete terminal.

To increase the efficiency and lower the cost of supplying and distributing electric energy to thousands of individual customers of an electric utility company, the requirement exists to provide reliable and low cost communication links between a central station and each of the remote customer locations. Such communication links afford control of customer loads to avoid emergency outages and to effect load shedding during peak power usage. The communication links further afford monitoring of an individual customer's power consumption on a daily or different times of day basis. Since large numbers of remote communication terminals are required for connection at each customer location, the remote communication terminal must be manufactured without excessive cost and also provide for simple and flexible communication signaling techniques for transmitting different types of command, interrogation and response data between the central station and the remote terminals. An important aspect in the design of the remote terminals is the provision of address recognition circuit configurations which will simply and efficiently authenticate different addressing formats corresponding to different types of addressing objectives to be accomplished by various data transmitted to one or more customer locations. The data transmissions may be desired to be sent exclusively to an individual terminal or simultaneously to one or more large groups of such terminals including the individual terminal. In addition to the addressing circuits, the remote terminals must incorporate therewith function control circuits to respond to selective load control commands and load status and meter reading interrogation requests.

In U.S. Pat. No. 3,702,460, a communication system for electric power utility is disclosed including a data receiving serial-input and parallel-output shift register connected to an address comparator module. The comparator module includes a diode code board and logic gates produce an output only if the remote terminal is properly addressed. Diodes are connected to the code board and to selected outputs of the shift register so as to provide a coded circuit arrangement that corresponds to an address portion of a coded data word. The aforementioned patent does not provide for a plurality of address formats or for address comparison and recognition as included in the present invention.

A utility meter remote reading system is described in U.S. Pat. No. 3,656,112 including a magnetic core memory for storing address words at a remote terminal. The magnetically stored address word bits are compared with transmitted address word bits in a parallel fashion at a shift register. Each received data bit of an interrogation message is compared with the corresponding bit of the address word in the shift register and logic circuits indicate if the received address is correct. The stored address of the remote terminal is provided by magnetic storage rather than by a fixed changeable circuit configuration as disclosed in the present invention and it does not provide for circuit changes to produce different address formats.

In U.S. Pat. No. 3,693,155 a power line communication system is disclosed having various levels of intermediate control stations or repeaters located between a base message station and a terminal control station. An interrogation receiver includes an authenticating circuit for comparison of a discrete address which is stored in a storage register. The incoming interrogation message includes address bits which are serially applied to a shift register and the contents of the shift register are transferred to a comparator which compares the contents of the discrete address register indicating that the address signals are identical. The authenticating circuit contains a number of address registers equal to the number of station levels to which the existing station is to transmit to. These registers store the addresses of all the message control stations through which the data must flow from a message station or intermediate control station to the terminal station. These multiple addresses are stored at a control station for repeating or retransmission purposes and not for addressing a given station or terminal with different address formats as included in the present invention.

In U.S. Pat. No. 3,582,922 a remote meter reading apparatus is disclosed having an address or identification coding circuit for identifying the meter which is to be read. A series of contacts are connected to either a low frequency or a high frequency tone oscillator so that as the contacts are scanned by a rotary wiper, an address signal is generated with coded high and low frequency tones. The address code generating technique is for transmission or recording of the address and not for authenticating or comparison of address at a receiving remote terminal.

SUMMARY OF THE INVENTION

In accordance with the present invention, a load management terminal (LMT) is provided for connection at each of the remote locations of customers of an electric utility company. The LMT includes a communication receiver and transmitter for coupling the LMT with a central station via a communication link, such as provided by a power line communication system. A plural address recognition circuit can authenicate different address formats. Each LMT has a unique address (UA) to distinguish each discrete customer location, a universal block address (UBA) for receiving data simultaneously transmitted to all customers or all customers of an extensive geographic area, and a selected block address (SBA) for receiving data simultaneously transmitted to a smaller or local geographic area. Associated with different address formats are different command or interrogation responsive circuits.

To simplify and reduce the cost of an LMT, the UBA and SBA portions of the recognition circuit are arranged to permit simplified mass production techniques. The UBA and SBA may be preprogrammed into each terminal by simple wiring connections. The connections can be varied to produce different internally generated addresses defining the UBA and SBA. In carrying forth the present invention, the UBA and SBA address recognition arrangement includes a common internal address generator that initiates a plurality of differently coded serial bit streams when a data word message is received at the terminal.

Each received data word includes address data bits designating one of the unique, selected block or universal block addresses of an LMT. A connector means selectably connects one of the internal generator bit streams, defining the SBA internal address, to an SBA comparator and another of the bit streams defining the UBA internal address, is connected to a UBA comparator. The bit streams of the internal address generator include bit intervals corresponding to the bit intervals of the received data word. Accordingly, the received data word is applied to the SBA and UBA comparators and when an identical SBA or UBA is included therein, an equality logic signal is produced at the corresponding comparator output. An additional UA generator and UA address comparator circuit similarly compare the received data word to authenticate a UA coded portion of the received data word.

Associated with the UA, UBA and SBA address recognition circuit are function control circuits responsive to command and interrogation data portions of a received data word also having a corresponding one of the three LMT addresses. In alternate modes of addressing an LMT, a data word with a UBA is transmitted to effect simultaneous disconnect of all electric hot water heaters or air conditioners of a very large number of utility customers during a critical power shortage condition. Time spaced data words having different SBA coded signals can be transmitted so that hot water heaters or air conditioners of different selected blocks of customers can be turned off and on successively to partially shed the electric utility company loads during potentially critical power shortage conditions. When a watthour meter reading or status of loads of an individual customer is desired, a data word is transmitted with a UA and a read meter or load status interrogation coded function to effect remote meter reading or load status indicating responses from the LMT.

The internal address generator utilizes a fixed frequency signal source applied to a frequency divider. Plural outputs of the divider are applied to a decode logic circuit for producing a plurality of differently coded bit streams, each capable of defining, within a predetermined number of data bits, a UBA or an SBA address code for comparison and equality with corresponding received address codes at the address recognition circuit. The decode logic also provides a source of signals for driving a clock signal source producing clock signals for the LMT logic circuits.

The address generator bit streams are separately terminated so that a connector means, such as formed by a jumper wire, can be simply installed to couple an SBA defining bit stream to the SBA address comparator. A permanent conductor means preferably connects a UBA defining bit stream to the UBA address comparator because all terminals of the system may have the same UBA. Accordingly, identical terminal units can be mass produced already having a fixed or permanently programmed UBA and, by installing a single jumper wire, large numbers of terminals can be selectively preprogrammed with a common SBA. The preprogrammed UA of each LMT requires a small number of simple connections, each being different, to define a discrete address for each of the thousands of terminals that may be required by an electric utility communication system.

Each of the three address comparators in the address recognition circuit includes a logic gating means which is enabled for the time duration allocated for the number of bits defining the address portion in each received data word. The internally generated SBA and UBA signals are serially applied to an associated comparator logic gating means which also serially receives the received data word with an address. When the binary coded bits of two input address codes at one of the comparators are identical, the comparator is activated to produce an equality logic signal.

Accordingly, the present invention uniquely provides a load management terminal capable of having a multi-address format for quickly and efficiently communicating different types of command and interrogating data transmissions between a central station and a discrete customer or alternately defined groups of electric utility customers including the discrete customer. Simplified and easily installed preprogrammed internal address circuitry with reliable and failsafe address comparison circuits facilitates the alternative communication with a large customer area or smaller customer areas within the large area by use of remote communication terminals produced at lower cost.

BRIEF DESCRIPTION OF THE DRAWINGS

A more complete understanding of the present invention can be obtained by considering the following detailed description made in connection with the accompanying drawings, in which.

DETAILED DESCRIPTION OF THE INVENTION

Figure 1:
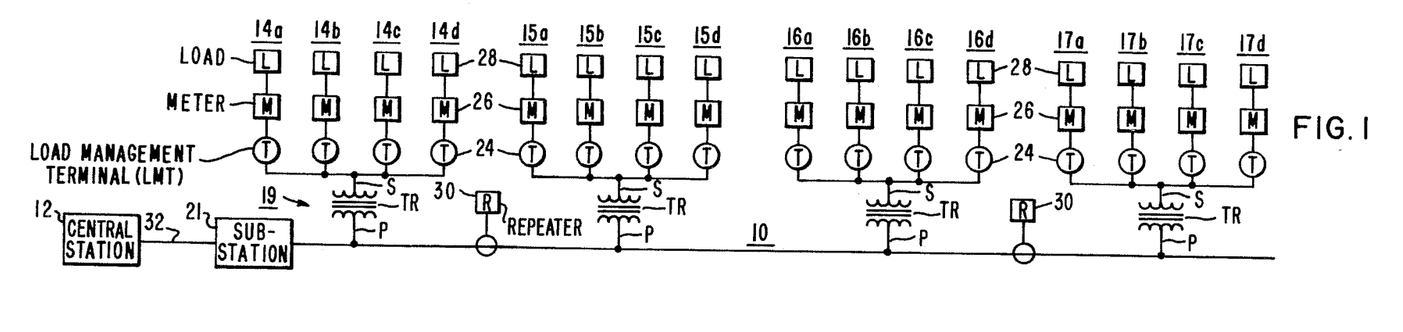
FIG. 1 illustrates a block diagram of a power line communication system including a load management terminal, made in accordance with the present invention, at each of the locations of a large number of electric utility customers.

Referring now to the drawings, and more particularly to FIG. 1, a block diagram illustrates a power line communication system 10 of an electric utility for communicating between a central station 12 and each of the utility's customers. Exemplary customer locations are designated 14*a*, 14*b*, 14*c* and 14*d*; 15*a*, 15*b*, 15*c* and 15*d*; 16*a*, 16*b*, 16*c* and 16*d*; 17*a*, 17*b*, 17*c* and 17*d*. The customer locations 14*a*–14*d*, 15*a*–15*d*, 16*a*–16*d*, and 17*a*–17*d* are representative of subgroups or subgeographical areas containing hundreds or a few thousands of customer locations being supplied electric power from the secondary power line conductors S of a power line distribution system 19. The secondary conductors S are connected to large numbers of distribution transformers TR typically required to serve the aforementioned numbers of customer locations. The high voltage side of the distribution transformers TR are connected to a primary power line conductor P served by a substation 21 which is representative of one or more of such substations required to serve a large geographic area of customers, including all the customer locations shown in FIG. 1.

Each of the customer locations shown in FIG. 1 includes one of the load management terminals (LMT's) 24, each made in accordance with the present invention and described in further detail with reference to the FIGS. 2 through 5 hereinbelow. Each customer location also includes one of meter reading encoder equipped watthour meters 26 for measuring and encoding the consumption of electric energy supplied to the customer electric loads 28. Communication carrier signals are transmitted between the LMT's 24 and the substation 21 through the distribution line conductors P and S which also have associated two-way repeaters 30 forming the communication system 10.

One example of the communication system 10 is described and claimed in U.S. Pat. No. 3,911,415, issued Oct. 7, 1975 and assigned to the assignee of this invention. It is to be understood that the LMT described and claimed hereinbelow is not limited to such power line communication systems as described and claimed hereinbelow or in the aforementioned patent. Carrier communication signals are impressed on and received from the power line conductors P and S at transmitters and receivers, not shown, at the substation 21 and at each of the LMT's at the customer locations. The two-way repeaters 30 are coupled to the power line conductors to amplify and retransmit the carrier communication signals as they are transmitted over the power line conductors. An example of one repeater arrangement suitable for use in the communication system 10 is described and claimed in U.S. Pat. No. 3,942,170, issued Mar. 2, 1976 and U.S. Pat. No. 3,967,264 issued June 29, 1976, both assigned to the assignee of this invention and are hereby incorporated into this application by reference. The communication link 32 between the central station 12 and substation 21 may be formed by a conventional telephone line. As described in the aforementioned referenced patents, the communication carrier signals are modulated with binary coded messages, including command, interrogation and response intelligence or functions to be communicated between the central station 12 and the customer locations. The LMT's 24 are provided with a plurality of address formats and associated circuitry for response to the addresses as described in detail hereinafter.

Figure 2:
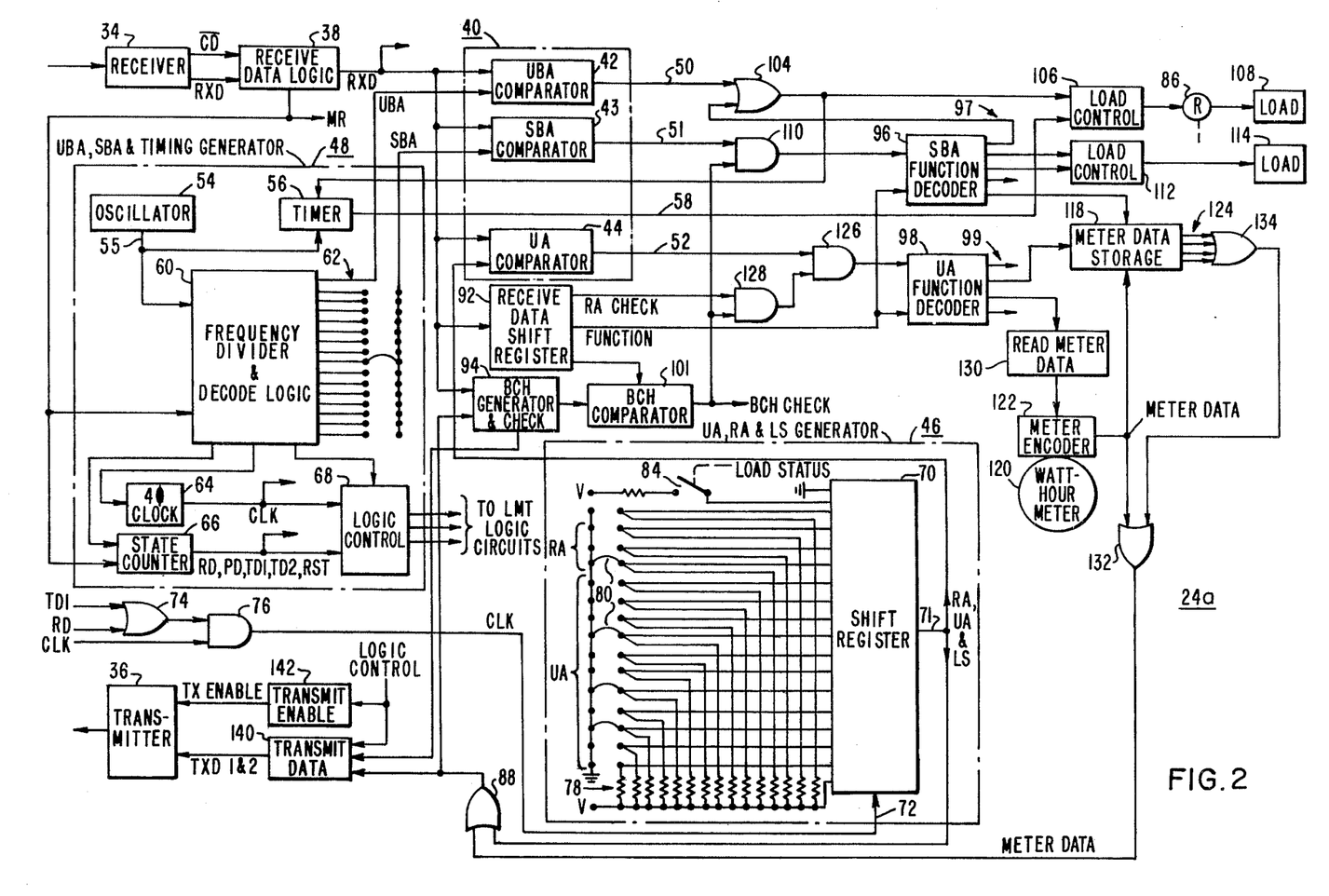
FIG. 2 illustrates a block schematic diagram of the load management terminal shown in FIG. 1.

Referring now to FIG. 2, there is shown a block schematic diagram of the LMT 24a which is exemplary of the LMT's 24 shown in FIG. 1. The LMT 24a is capable of receiving and being responsive to selected ones of a unique address (UA), a selected block address (SBA), or a universal block address (UBA). The UA identifies each discrete customer LMT so that each of the locations 14a, 14b through 17c and 17d, shown in FIG. 1, would have a separate and discrete binary coded unique address. The SBA is the same for all of the LMT's 24 at all of the customer locations of a selected geographic area. Accordingly, the LMT's at locations 14a through 14d would have a common SBA and the LMT's at the locations 15a through 15d would have a different common SBA. Correspondingly, the LMT's 24 at the locations 16a through 16d and at the locations 17a through 17d have two additional and different SBA formats. The UBA is common to all of the LMT's 24 of the customer locations of a large geographic area. Accordingly, all of the LMT's 24 shown in FIG. 1 have the same UA. The desirability of the different address formats will become apparent with the explanation hereinbelow of the details of the LMT 24a shown in FIG. 2.

Referring now in more detail to the LMT 24a shown in FIG. 2, a receiver 34 and transmitter 36 interface the LMT with the communication system 10 shown in FIG. 1. The receiver 34 and transmitter 36 are coupled to the secondary conductor S of the system 10. Communication signal coupling of such receivers and transmitters to power line conductors for transmission and reception of carrier signals is well understood by those skilled in the art. Binary coded intelligence in the received carrier signals is derived by demodulation techniques in the receiver 34. Accordingly, a carrier detect $\overline{CD}$ signal is first initiated by the receiver 34 indicating that the receiver has been activated by a received carrier signal. Following the $\overline{CD}$ signal a binary coded receive data word RXD is produced at the output of the receiver 34. $\overline{CD}$ and RXD signals are applied to a receive data logic circuit 38. The RXD signals are capable of having one of the three receive address formats defining the UA, UBA or SBA and are described more fully in connection with the description of the timing diagrams illustrated in FIGS. 4 and 5.

The outputs of the receive data logic 38 include a master reset MR logic signal produced in response to the $\overline{CD}$ signal and the start of the RXD signal. The binary coded RXD signal is produced at the output of the logic circuit 38 and is applied to a plural address recognitiion circuit portion 40 of the LMT. Three address logic comparators are formed by a UBA comparator 42, a SBA comparator 43 and a UA comparator 44. These comparator circuits are described in detail hereinbelow in connection with the description of FIG. 3. The address recognition circuit 40 further includes means for internally generating the UA, UBA and SBA binary address signals. The UA signals are developed in an internal UA, repeater address (RA) and load status (LS) generator 46. The UBA and SBA binary signals are generated in an internal UBA, UBA and timing generator 48. Accordingly, the internally generated UA, UBA and SBA signals are applied to the comparators 42, 43 and 44, respectively. As more fully described hereinbelow, the internal generated address signals are serially compared with the address portion of the RXD signal to produce an equality logic signal at the outputs 50, 51 and 52 of the comparator circuits 42, 43 and 44, respectively.

The generator circuit 48, in accordance with the important feature of this invention, includes a source of fixed frequency signals having a predetermined frequency which is formed by an oscillator 54 which is of a type producing signals at its output 55 at a frequency of 32.768 KHz. The oscillator output signals are applied to a timer 56 which produces, at its output 58, logic signals indicating intervals of 15, 30, 60 and 120 minute intervals. The timer output 58 is effective to control the customer loads for different time periods as noted further hereinbelow. The timer 56 includes suitably connected solid state digital integrated circuits including a binary counter/divider type CD4020 and binary counter/divider type CD4060, available from the RCA Corporation, Solid State Division, Somerville, NJ 08876.

Figure 3:
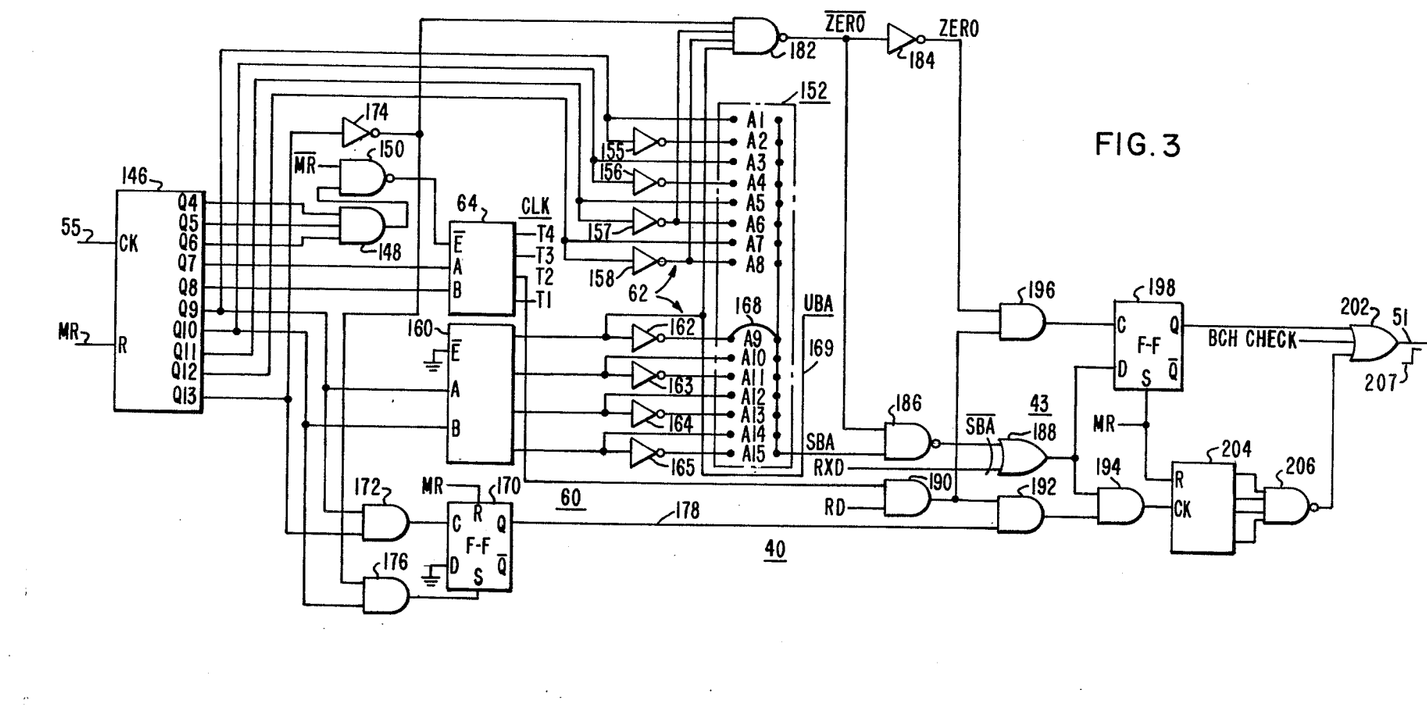
FIG. 3 illustrates an electrical circuit diagram of a portion of a plural address recognition circuit including a combined universal block address, selected block address and timing generator and an address comparator shown in FIG. 2.

The generator circuit 48 further includes a frequency divider and decode logic section 60 described in particular detail with reference to FIG. 3. Generally, the circuit section 60 receives the output of the oscillator 54 and the MR logic signal. The UBA and SBA signals are produced by the circuit section 60 such that the internal address signals are initiated upon the occurrence of the MR signal being initiated at the circuit 38. A plurality of different binary coded bit streams are produced at a plurality of outputs 62 of the circuit section 60. One of the bit streams defines UBA and another defines SBA, as also described more fully hereinbelow. The circuit section 60 further includes outputs to a four phase clock 64 producing the logic clocking signals CLK in the manner shown in FIG. 3. A state counter 66 also receives an input from the circuit section 60 and the MR logic signal. The state counter 66 is formed by a divide-by-eight counter/divider circuit type CD4022, also from the aforementioned RCA Solid State Division. The output of the counter 66 establishes the operating mode of the LMT 24a by initiating a receive data (RD), a process data (PD), a transmit data one (TD1), transmit data two (TD2), and a reset (RST) logic signal. The RD, PD, TD1 and TD2 logic signals from the counter 66 are each different logic signals produced for a duration of 32 bits successively following each other after the receipt of a receive data word RXD at the receiver 34. Accordingly, the LMT circuit 24a is conditioned to receive data for 32 bits, then pause for 32 bits to let time pass for performing the indicated commands or interrogations of the received data and then transmit data in one format for 32 bits and transmit data in a second format for 32 bits and then the RST signal resets the LMT to a quiescent condition.

Finally, the generator 48 includes logic control circuits 68 for effecting appropriate control of the digital integrated logic circuits in the LMT in response to the logic CLK signals and the outputs of the state counter 66.

Referring now to the UA, RA and LS generator 46, a 32 stage shift register circuit 70 is included therein and is formed by four eight stage static shift registers of a type CD4021, available from the aforementioned RCA Solid State Division. Generally, the shift register 70 performs a parallel to serial data conversion and is operative both during receive and transmit states of operation of the LMT. The clock input line 72 to the shift register 70 is provided with the CLK clock signals when either the TD1 or RD logic signals are applied to the NOR gate 74 with the CLK signals applied to the AND gate 76. The parallel inputs to the shift register 70 are shown on the lefthand side thereof as viewed in FIG. 2. A binary one or zero logic state is provided in a conventional manner at the shift register inputs by connecting the voltage sources V through one of the resistors 78 to a different one of the inputs or connecting one of the inputs to ground potential by connecting one of the jumper wires 80 to the common grounded conductor 82. The jumper wire conductor arrangement may be easily provided by a terminal board, not shown, having two parallel rows of adjacent terminals. The portion of the inputs indicated by the bracket designated UA provides either binary one or zero logic states at the inputs of the shift register 70 corresponding to the unique address portion thereof which is internally generated in a serial fashion upon the clock CLK signals being applied at the input line 72.

The remaining portions of the inputs to the shift register 70 are reserved for a coding repeater address at the inputs included in bracket RA and for load status LS coding as indicated in the upper portion of the generator 46. A load status relay contact 84 has either an open or closed condition for producing a binary one or zero logic state at the corresponding input of the shift register in accordance with the actuation of a load status relay 86 having energized and deenergized conditions, as described hereinbelow.

When RXD receive data is applied to the LMT 24a, the shift register 70 provides the internally generated UA address, as programmed by the jumper wires 80 at the inputs of the shift register 70, and the CLK signals serially clock out the UA signals to the comparator 44 so that the UA signals of the RXD signals, if occurring therein, will produce an equality logic signal output at the comparator output 52.

Figure 4:
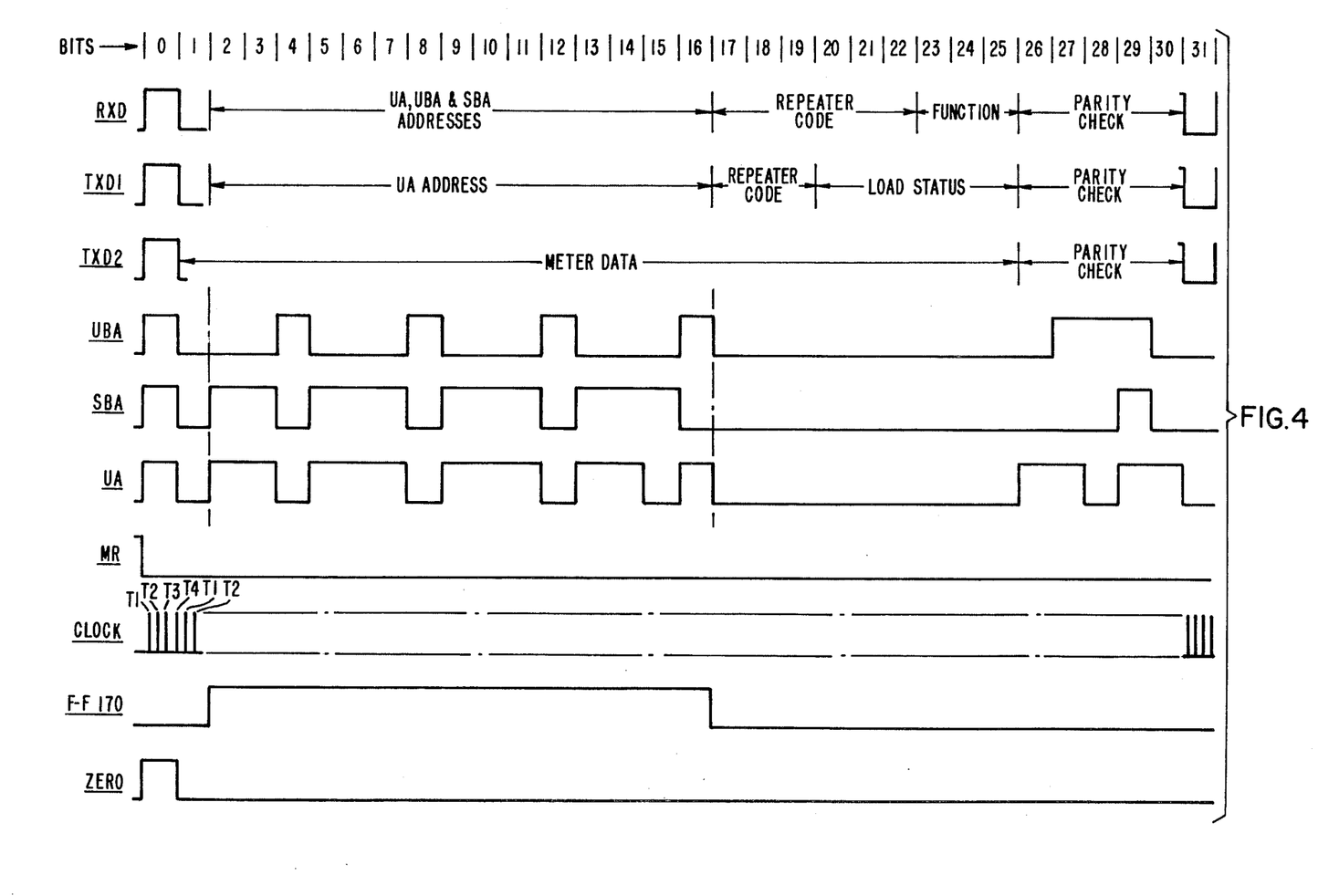
FIGS. 4 and 5 illustrate timing diagrams of signals occurring in the diagrams of FIG. 2 and FIG. 3.

In accordance with the TXD1 data format shown in FIG. 4, the shift register 70 is capable of serially producing the output data word portions including the unique address, repeater code and load status portions of the TXD1 transmit data word. The transmit data output of the shift register 70 is applied to the OR gate 88, which also receives meter data coded information for transmitting the TXD2 transmit data word format also shown in FIG. 4.

Referring now to the remaining portions of the LMT 24a, the RXD signal is further applied to a receive data shift register 92 and to a BCH generator and check circuit 94. The RXD signals include function and parity check data portions. The function data contained therein is in the form of three bit coded commands or interrogation intelligence for the LMT. Accordingly, the function coded portion of RXD is applied from the shift register 92 to an SBA function decoder 96 preferably having eight outputs 97 and a UA function decoder 98 also preferably having eight outputs 99.

Before describing further the interrogation and command function response of the LMT 24a, a brief description of the signal parity checking function of the LMT is made since it does not form a part of the present invention. Associated with the BCH generator and check circuit 94 is a BCH comparator circuit 101. As is known, BCH is an acronym formed from the names of Messrs. Bose, Chaudhuri, and Hocquenghem because of their contribution to error detecting cyclic codes. A cyclic code is so described because of its property which allows the bits of the code to be cyclically shifted in some fashion without losing the identity or effectiveness of the code. Reference to this form of cyclic code checking is further described in the book, *Reference Data For Engineers*, 5th Edition, by Howard W. Sams and Co., Inc., Indianapolis, Indiana 46268 in Section 38-23 through 38-27. In the RXD, TXD1 and TXD2 word formats shown in FIG. 4, five parity check bits are used in each 32 bit word employing the BCH cyclic code checking technique. Accordingly, during the first 26 bits of a received data word RXD, the BCH check portion of the circuit 92 develops the BCH parity code concurrently while the RXD signals are applied to the shift register 92. The output of the shift register 92 and of the BCH circuit 98 are applied to the BCH comparator 101 to initiate a BCH check logic circuit at the output of the circuit 101 when there is parity between the first 26 bits of received data. The BCH generator and check circuit 94 also produces the five parity check data bits for transmit data words TXD1 and TXD2 in response to the first 26 bits of transmit data from the generator 46 or from meter data, described hereinbelow.

Referring now to the command and interrogation response operations of the LMT 24a, the output 50 of the UBA comparator 42 is applied through an OR gate 104 to effect operation of a load control circuit 106. The load control circuit 106 preferably includes a flip-flop circuit, not shown, having an output which controls a transistor amplifier connected in series with a relay device. The contacts of the load control relay, not shown, is in series with the utility customer's electric power connected to a first customer load 108 which, for example, may include a hot water heater. The load status indicating relay 86 is concurrently energized and deenergized with the energization and deenergization of the load 108 to appropriately actuate the switch 84 connected in the load status input of the shift register 70. The load control 106 further includes an input from the line 58 at the output of the timer 56 which in one preferred embodiment causes the load control to reenergize the load 108 after it has been deenergized for a predetermined time, for example 2 hours, following the deenergization thereof in response to an RXD signal including a universal block address.

Several outputs 97 are indicated at the righthand side of the decoder 96 representing that up to eight different command or interrogation operations may be decoded therein in response to the corresponding command and interrogation signals received from one of the RXD signals. Accordingly, the output 51 of the SBA comparator 43 is applied to an AND gate 110, which is enabled by the BCH check logic at the output 102 of the comparator 101 to enable the SBA function decoder 96. The coded function information is applied at the output 93 of the receive shift register 92. Accordingly, the decoder 96 produces the appropriate output response in accordance with the function data output of the shift register 92. One output of the decoder 96 is shown being applied to the OR gate 104 to effect the same control of the load 108, as just described in response to an output from the RXD signal including a UBA. A further load control circuit 112 may be provided for control by the decoder 96 to effect energization and deenergization of a second customer load 114, which, for example, may be a customer air conditioning load or other substantial electric power consuming load device. The load control circuit 112 may include a circuit, not shown, as described for in the circuit 106. The two inputs from the decoder 96 to the load control 112 may include a turn-off command and the other can be a turn-on command so that the load 112 may be remotely turned off and turned on from the central station. Alternatively, the load control 112 also can be controlled by time interval signals from the timer 56 as is load control 106.

A further output of the decoder 96 may include a logic command signal to a multiple meter data storage portion 118 of the LMT. In one preferred embodiment, the LMT is connected to a customer watthour meter 120 equipped with a meter reading encoder 122, such as described in U.S. patent application Ser. No. 669,547, filed Mar. 23, 1976 and assigned to the assignee of this invention. The meter reading encoder 122 digitally encodes the pointer shafts of the dial register of the meter 120. The meter data storage is capable of storing meter data at different times of day (TOD). Accordingly, a large block of customers may have their meter reading data stored for up to four times each day when the decoder 96 produces an output to the meter data storage 118 to store four different meter readings. The four outputs 124 of the meter data storage 118 represent the outputs of four separate memory registers which may be read out in response to the UA function decoder 98, described hereinbelow.

The UA comparator output 52 is applied to an AND gate 126 and a second input to the gate 126 is received from an AND gate 128. The two inputs to the gate 128 include the BCH check from the output 102 and a repeater address (RA) check produced at the output of the register 92 which are activated during the repeater address portions of the receive data word. The received repeater address portions of the RXD signals should have the binary zero state and provide an additional data check. Accordingly, the gates 128 and 126 provide combined logic gating which produces an enabling signal input to the decoder 98 which, if the unique address is included in the RXD signal, the function output of the shift register 92 will effect a desired one of the outputs 99 at the decoder 98. One of the decoder outputs 99 is applied to a read meter data control circuit 130 which effects a readout of the meter encoder 122 directly to the OR gate 132 to produce meter data information at the input to the gate 88. In another mode of operation, the decoder 98 applies a signal to the meter data storage 118 to separately read out the outputs 124 of the four memory registers containing the time of day meter readings. The outputs 124 are applied to an OR gate 134 having an output also applied to the OR gate 132. Either the stored meter data or direct meter encoder data is thus provided to the OR gate 88.

During the transmit state of operation of the LMT 24a, appropriate logic signals are generated including the signals TD1 and TD2 from the state counter 66 to produce clock signals CLK at the output of the AND gate 76 so as to produce a serial output of the shift register 70 including the unique address UA of the LMT. During the transmission of the TXD1 data word, which includes a readout of the load status and repeater codes, the signals applied to the OR gate 88 are combined with a transmitted BCH signal produced at the BCH generator portion of the circuit 94 and applied to the transmit data logic 140. Prior to the transmission of data from LMT, the logic control 68 produces a TX enable logic signal from the transmit enable circuits 142. The transmit enable is normally produced during the PD logic output of the state counter 68 to allow the transmitter to turn on and become operable before transmitting data. During the tranmsission of the TXD2 data, the meter data from the OR gate 132 is applied directly to the OR gate 88 and combined with the BCH check signals and does not include the unique address of the LMT. This provides a simplified operation since a direct encoder meter data output in the TXD2 data follows the TXD1 data including the unique address coded therein. Therefore, the transmitted meter data of the TXD2 data will correspond to the unique address in TXD1 first transmitted to the central station.

Before describing the details of the address recognition circuit of the LMT, a general description of the receive and transmit address and data word formats is now described with reference to FIG. 4. The carrier signals of the communication system 10 shown in FIG. 1 are modulated with binary coded data for asynchronous data transmission. Each received and transmitted data word at the LMT of this invention includes 32 bits being designated bit 0 through bit 31. The first bit 0 is always coded as a binary one and the last bit 31 is always coded as a binary zero in accordance with the asynchronous data transmission technique. The top three graphs in FIG. 4 are designated RXD, TXD1 and TXD2, corresponding to the receive data, transmit data one and transmit data two words received and transmitted at the LMT. The RXD data word includes the first or synchronizing bit 0 having the binary one state. Bit 1 is reserved for use in connection with the communication system and signal coupling therein. Bits 2 through 16 are reserved for the coded addresses UA, UBA or SBA. This permits 16,384 different addresses to be allocated for the remote LMT's 24 shown in FIG. 1. In one system utilizing the present invention, there is one unique address UA, 15 selected block addresses SBA and one universal block address UBA, the latter two addresses being provided in accordance with a principal feature of this invention. Bit 17 through bit 22 are reserved for repeater codes which are transmitted from the substation and the six bits of repeater code permit reserving two bits for one level of repeater, two bits for a second level of repeaters, and the remaining two bits for a third level of repeaters to provide an economical form of signalling through the communication system 10 shown in FIG. 1. As described in the above-referenced U.S. Pat. No. 3,967,264, the repeater removes its own code upon retransmitting. Therefore, the LMT receive data word RXD will include bit 17 through bit 22 intervals all coded with binary zeros. Bit 23, bit 24 and bit 25 are used for indicating the function to be performed at the LMT. These three bits are utilized in the SBA function decoder 96 and UA function decoder 98 described hereinabove to produce a response to one of eight function commands received at the LMT. The parity check portion of the received address word RXD includes five bits, bit 26 through bit 30 for use in the BCH parity check technique, also described hereinabove. Finally, the last and thirty-second bit 31 is always a binary zero, as noted hereinabove.

The transmit data word TXD1 has the start bit 0 as described above, the spare bit 1 and bit 2 through bit 16 for the unique address UA. The UA is generated in the shift register 70 by placing the jumper wire connectors 80 at selected ones of 15 inputs to the shift register 70. Bit 17, bit 18 and bit 19 have a repeater code which is provided by the three RA inputs to the shift register 70. The bit 20 through bit 25 portion of the TXD1 data word is provided for the load status LS data indicating the energized or deenergized state of the customer loads, as noted hereinabove in connection with the description of FIG. 2. The remaining portion of the TXD1 data word includes the parity check portion, which is generated at the circuit 94 in FIG. 2. The last bit 31 is always coded as a binary zero. Finally, the TXD2 data word includes the start bit 0 followed by bit 1 through bit 25, which is the encoded meter data described hereinabove, followed by the parity check and end bit 31 which are generated in the same manner as for the TXD1 described above. It is to be understood that the parity check changes with changes in the preceding 26 bits of data in each transmitted data word.

The different address formats UA, UBA and SBA provided in the RXD data word provide the three different addresses at each LMT for different functions. The universal block address UBA is provided to normally perform a single emergency type function, such as to turn off all water heaters designated as customer load 108 in FIG. 2. The unique address UA includes the eight functions provided at bits 23, 24 and 25; and these may typically include an interrogation to (1) read the watthour meter or to (2) respond to the status of the loads for which six separate data slots are provided, to (3) read one of the four time-of-day stored meter readings, or to (4) read auxiliary meter readings, such as a watt demand meter or other utility meter readings, such as water and gas meters. The RXD data word further includes the selected block address SBA which includes the eight functions which are sent to all of the meters in a selected geographic area. These eight command functions may be to turn off the water heater indicated at load 108 in FIG. 2; to turn off the auxiliary load 114; and to return or to turn on, to store each one of the four time-of-day meter readings in the meter data storage 118 and to provide a further function that may be desired.

The TXD1 transmit data word includes the unique address UA of the particular LMT so as to indicate the status of the particular customer location. The TXD2 does not include the LMT unique address since the TXD1 and TXD2 data words are normally transmitted together. The system is generally operated by a combined interrogation and response message sequence, as noted above. Four 32 bit intervals are successively provided for the combined interrogation and response signalling. The RXD data word is transmitted, followed by a 32 bit processing data interval so that the LMT can provide the functions and prepare the circuits for transmission of the TXD1 and TXD2 data words. Accordingly, the third and fourth 32 bit intervals are provided for transmission of the TXD1 and TXD2 data words from the LMT. As noted above in connection with the description of FIG. 2, the state counter 62 generates the RD, PD, TD1 and TD2 logic signals which are each 32 bits long during the aforementioned four 32 bit intervals.

The graphs of signals designated UBA, SBA and UA illustrate three typical RXD data word formats in which the bits 2 through 16 are coded with the UA, UBA and SBA address assigned to a discrete LMT. The UBA and SBA addresses are authenticated by the address recognition circuit 40, noted in connection with the description of FIG. 2. The circuit 40 and requires that the UBA and SBA addresses be internally generated and compared with the received address bits and the description hereinafter is directed to the manner in which the address recognition circuit 40 is arranged and operated.

In FIG. 3 there is illustrated a detailed electric circuit diagram of the frequency divider and decode logic circuit section 60 and the SBA comparator 43 included in the address recognition circuit 40 shown in FIG. 2. It is to be understood that the operation and arrangement of the comparators 42 and 44 are substantially identical to that of the comparator 43, described in detail hereinbelow. The circuit section 60 includes a frequency divider 146 formed by a 14-stage ripple-binary counter/divider type CD4020 available from the aforementioned RCA Solid State Division. The frequency divider 146 has its clock input connected to the output 55 of the oscillator 54 to receive the 32.768 KHz signals. The reset input receives the MR logic signal from the logic circuit 38 shown in FIG. 2. The Q4, Q5 and Q6 outputs are all connected to an AND gate 148 having an output connected to the NAND gate 150. The other input to the NAND gate is $\overline{MR}$ which is the inverted form of MR from FIG. 2. The output of gate 150 is connected to the four phase clock 64 formed by a binary 1 of 4 decoder/demultiplexer type CD14555 available from the aforementioned RCA Solid State Division. The output of gate 150 is connected to the $\overline{E}$ input of the circuit 64. The Q7 and Q8 outputs of the frequency divider 146 are connected to the A and B inputs of circuit 64. The four outputs are the four phase clock CLK signals T1, T2, T3 and T4 shown in FIG. 4.

Figure 5:
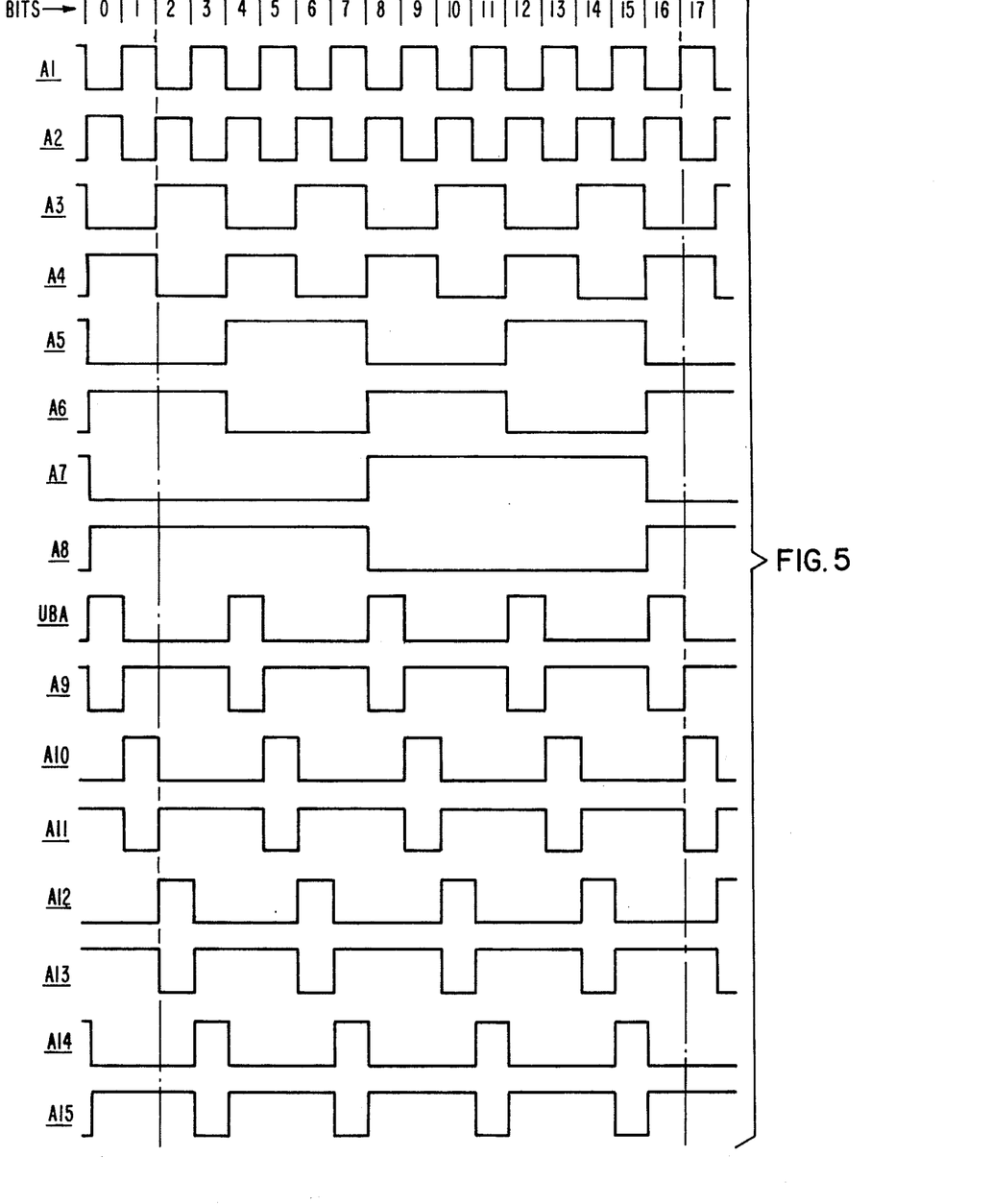

A terminal board 152 includes mutually aligned pairs of terminals designated A1 through A15. The righthand terminals of each of the pairs are connected together and to the SBA output to couple the internally generated SBA code signal to the comparator 43, as described further hereinbelow. The lefthand terminals of each pair are separately connected through decode logic circuitry to the Q4 through Q13 outputs of the frequency divider 146 to produce the 15 different binary coded bit streams shown in FIG. 5. The bit streams in FIG. 5 are designated by the corresponding outputs A1 through A15 and UBA shown in FIG. 3 where they are developed.

To provide easily accessible outputs of the 15 different binary coded bit streams, the Q9 output of the frequency divider 146 is connected directly to the A1 terminal and through an inverter 155 to the A2 terminal. Similarly, the Q10 output is connected directly to the A3 terminal and through an inverter 156 to the A4 terminal, the Q11 output is connected directly to the A5 terminal and through an inverter 157 to the A6 terminal, and the Q12 output is connected directly to the A7 terminal and through an inverter 158 to the A8 terminal. The Q9 and Q10 outputs are connected to a decoder circuit 160 which is identical to the circuit 64. The A and B inputs thereof receive the Q9 and Q10 outputs, respectively, and the $\overline{E}$ input is grounded. The four outputs of the circuit 160 are connected so that the first is connected through an inverter 162 to the A9 terminal, the second is connected directly to the A10 terminal and through an inverter 163 to the A11 terminal; the third output is connected directly to the A12 terminal and through an inverter 164 to the A13 terminal; and a fourth output is connected directly to the A14 terminal and through an inverter 165 to the A15 terminal. Thus arranged, the oscillator 55 produces the 16 bit streams designated A1 through A15 and UBA. A selected one is connected to the SBA output by means of a single connector means, such as formed by a jumper wire 168 installed across one of the pairs of terminals, such as A9, as shown in FIG. 3. A permanent conductor 169 connected to the first or top output of the circuit 160 provides the UBA coded bit stream. Thus, 15 alternately selectable SBA bit streams and one UBA bit stream are generated for use as internal and reference address codes by the address recognition circuit 40.

The bit streams produced by the frequency divider and decode logic 60 include bit intervals which are the same as the bit intervals of the intelligence modulated on the system communication signals transmitted through the communication system 10. Accordingly, the frequency of the oscillator 54 produces a bit interval having a duration or period of approximately 7.812 milliseconds, a bit repetition rate of approximately 128 bits per second so that the 32 bit data words have a time duration of 249.984 milliseconds.

A D-type flip-flop 170 is provided in the circuit section 60 to generate a logic signal having a time duration from the beginning of bit 2 to the end of bit 16 which is the duration of the 15 bit address portion of each of the data words shown in FIG. 4. The Q13 output of the frequency divider 146 is connected to one input of an AND gate 172 and through an inverter to an input of an AND gate 176. A second input to the gate 172 is applied from the Q9 output and a second input to the gate 176 is applied from the Q10 output. The outputs of the gates 172 and 176 are applied to the clock C input and set S inputs, respectively, of the flip-flop 170. The reset R input is connected to receive the MR logic signal from FIG. 2. The output 178 of the flip-flop 170 produces a logic signal extending between bit 2 and bit 16, as noted above and is applied to the comparator circuit 43.

To further provide logic signals for the comparator circuit 43, a NAND gate 182 is provided in the circuit section 60 having inputs connected from the outputs of the inverters 157, 158 and 174 and from the first output of the decoder circuit 160. The output of the gate 182 develops a $\overline{ZERO}$ logic signal and is applied through an inverter 184 to produce a ZERO logic signal. The ZERO logic signal is shown in the timing diagram of signals in FIG. 6 and is produced for one bit interval at the beginning of the first or bit 0 for utilization by the comparator circuit 43, as described hereinafter.

The address comparator 43 provides a serial bit type of address verification of the internally generated SBA signal and the corresponding selected block address portion of the RXD data word. To accomplish the address comparison, the comparator 43 includes a NAND gate 186 receiving the internally generated SBA signal from the circuit 60. The $\overline{ZERO}$ logic signal goes from high to low logic levels during the the bit 0 interval and returns to the high level. The $\overline{SBA}$ signals produced at the output of the gate 186 are inverted and with opposite data logic from that at the SBA input to the gate 186. The gate 186 output is connected to one of the inputs of an exclusive-OR gate 188. The received data word RXD is applied to the second input of the gate 188. The CLK T1 signals are applied to the AND gate 190 which is enabled by the RD logic signal from the counter 66 to pass the positive going clock signals to its output. The gate 190 output is connected to one input of the AND gate 192. The other input to gate 192 is applied from the flip-flop 170 so that the CLK signals are gated to the output of gate 192 only during the interval between the beginning of bit 2 and the beginning of bit 17, corresponding to the 15 bit intervals for the address data. AND gate 194 has two inputs connected to the outputs of gates 188 and 192, respectively. An AND gate 196 receives the ZERO logic signal and the CLK T1 signals from the output of gate 190. The gate 196 passes one CLK T1 pulse during bit 0 time to check the presence of the correct start bit 0 logic. A "D" type flip-flop 198 receives the gate 196 output at the clock C input thereof and the output of the exclusive-OR circuit 188 at the data D input. The set input receives the MR logic signal. The Q output of the flip-flop 198 is applied to the NOR gate 202 which has two additional inputs. A second input is from the BCH check logic signal from circuit 101 in FIG. 2.

To provide a third input to the gate 202 an up counter type CD4520, available from the aforementioned RCA Solid State Division, provides a four stage counter 204. The MR logic is applied to the reset input of the counter 204 and the clock input thereof receives the CLK T1 signals from the AND gate 194. The four counter outputs are each connected to a NAND gate 206. The output of the gate 206 provides the third input to the NOR gate 202. The output 51 of the comparator 43 produces a high level equality logic signal 207 when a selected block address of an RXD signal is received as described hereinafter.

In operation of the address comparator 43, it is initialized and synchronized by the ZERO, $\overline{ZERO}$, RD, MR logic signals. The exclusive-OR circuit 188 compares the serial data bits of the address portions of the RXD data word and the internally generated SBA signal. During the bit 2 through bit 16 intervals and the flip-flop 170 output stays in a high logic state. When the aforementioned signals are received at the comparator 43 in the correct sequence, the operation thereof proceeds as described hereinafter.

The MR logic signal goes low when the RXD data word is received to release the frequency divider 146 producing the SBA signals at A9 of the terminal board 152. Also the clock source 64 begins producing clock CLK signals. The ZERO and $\overline{ZERO}$ logic signals go high and low, respectively, during the first bit 0 interval. Bit 0 of the RXD signal will be high. The gate 186 output goes high for one bit interval causing the exclusive-OR gate 188 to go low for the bit 0 interval at the D input of flip-flop 198. At this bit interval the gate 196 passes one CLK T1 signal and the Q output is forced low at the first and top input to gate 202. At the bit 2 interval the $\overline{SBA}$ will begin having the opposite logic levels as the SBA address portion of the RXD has. The exclusive-OR gate 188 gate will now be high and remain high so long as the two inputs of gate 188 receive matching SBA address codes. The flip-flop 170 enables the gate 192 so that 15 CLK T1 signals are applied to the gate 194 during the bit 2 to bit 17 interval. The gate 194 passes 15 CLK T1 signals to the counter 204 after the MR logic signal releases the counter. The output of the gate 206 goes low upon the four outputs of counter 204 going high after receiving the 15 CLK T1 pulses. The output of the flip-flop 198 remains low after the bit 0 time and the BCH check will be low, in which case an equality logic signal 207 will be produced at the output 51 of the comparator circuit 43.

The circuit arrangement of the comparator 43 as shown in FIG. 3 produces a failsafe feature to prevent erroneous indications during the authentication operations on the received and internally generated addresses. The logic states of the logic circuit elements are all properly set initially so that when the addresses are occurring at bit 2 through bit 16 intervals, and they are identical, the 15 clock pulses to the counter 204 will produce a high to low transition at the gate 206 output thereof at the fifteenth clock CLK T1 signal and produce the equality logic signal 207 at the output 51. To assure that the aforementioned comparator operations occur properly, the proper operating states of the exclusive-OR gate 188 is first checked by triggering its output from high to low to high at bit 0 interval. This is necessary to reset the flip-flop 198 and produce its low output to the gate 202. If the gate 188 remains low and fails to go high no CLK T1 signals can be applied to the counter 204.

As noted hereinabove, the UBA comparator 42 and UA comparator 44 will have the same circuit configuration as shown in FIG. 3 for the comparator 43. All three comparators will receive the RXD data word and the one comparator which produces an equality logic signal output at one of the outputs 50, 51 or 52 indicates which of the three UA, SBA or UBA addresses have been received in the RXD data word at the LMT.

Briefly reviewing the operation of the LMT 24a by referring to the FIGS. 2, 5 and 6, particular reference is made to the operation for a receive data word RXD containing a selected block address SBA. The $\overline{CD}$ carrier detect signal is produced by the receiver 34 and the LMT circuits are reset and released from a quiescent condition by the MR logic signal so that the RXD data word is transferred to the inputs of the comparator circuits 42, 43 and 44. The RXD data word is also applied to the circuits 92 and 94. The internally generated bit streams including the UBA and SBA are produced at the outputs of the generator 48, also producing the logic control and timing and CLK signals. The UA address is generated from the output 71 of the generator 46. The mass production of the LMT's is substantially facilitated by the manner of producing the UBA signal in one of the bit streams from the circuit section 60. By simply selecting and connecting one of the fifteen outputs of the circuit section 60, selected ones of the different SBA signals are available for large numbers of LMT's having a common SBA. As described above, the internally generated addresses and the address portion of the RXD data word are compared in the address recognition circuit 40 including comparators 42, 43 and 44 during the bit 2 through bit 16 intervals.

Assuming that the correct selected block address has been received at the comparator 43, the output 51 produces an equality logic signal 207 and the outputs 50 and 52 of the comparators 42 and 44 will produce an opposite logic signal in accordance with the description hereinabove of FIG. 3. The LMT is then conditioned to be responsive to the command and interrogation functions included in the RXD signal having the SBA. After the first 32 bit receive data interval, the following 32 bit intervals for process data and TXD1 and TXD2 transmit data intervals of operations of the LMT are produced.

While a preferred embodiment of the present invention has been disclosed hereinabove, it is to be understood that equivalent and alternative embodiments of this invention may be made without departing from the spirit and scope of the claims.

I claim:
1. An addressable communication terminal for each of a plurality of remote locations linked to a central station by a communication system transmitting communication signals including binary coded data word messages having different binary address signals for selectively communicating with different ones of the remote locations, said addressable communication terminal comprising:
communication receiver means for receiving said communication signals including said binary coded data word messages including predetermined binary address signals designating a predetermined one of said remote locations;
internal address generator means including an output, a source of plural bit streams having different binary coded formats, and said address generator means further including connector means selectively connecting one of the bit streams to said output of said address generator means so that said output produces a coded signal defining an internal binary address signal corresponding to one of said predetermined binary address signals included in a received binary data word message; and
an address recognition means including one comparator means having first and second inputs, said first input receiving the binary address signals of said received binary data word messages and said second input receiving the output of said address generator means, and said one comparator means further including an output for producing an equality logic signal when said first and said second inputs receive matching received and internal address signals.

2. The addressable communication terminal as claimed in claim 1 wherein said internal address generator means includes a source of predetermined constant frequency signals and further includes frequency divider circuit means receiving said constant frequency signals and having a predetermined number of outputs for developing said plural bit streams.

3. The addressable communication terminal as claimed in claim 2 wherein said internal address generator means includes a decode logic circuit means receiving said outputs of said frequency divider circuit means and producing said source of plural bit streams.

4. The addressable communication terminal as claimed in claim 3 wherein said internal address generator means includes a terminal board having a plurality of terminals separately connected to a different one of said plural bit streams produced by said decode logic circuit means, and wherein said connector means includes a jumper wire connected between one of said terminals and the address generator means output with the generator output defining a selected block address for receiving signals at said addressable communication terminal intended to be simultaneously received by a predetermined group of said plurality of remote locations.

5. The addressable communication as claimed in claim 3 wherein said address generator means includes a source of clock signals receiving predetermined outputs of said decode logic circuit means so as to be responsive to predetermined outputs of said frequency divider circuit means and produce plural phase clock signals.

6. The addressable communication terminal as claimed in claim 5 wherein said address generator means includes an oscillator having output for producing signals at a predetermined constant frequency and connected to a clock input of said frequency divider circuit means and wherein an initial binary coded portion of said binary coded data word messages initiates a reset logic signal to said frequency divider circuit means so as to intitiate said plural bit streams at a frequency proportional to said oscillator output signals such that the bit stream frequency provides bit intervals in the bit streams substantially the same as bit intervals occurring in said binary coded data word messages.

7. The addressable communication terminal as claimed in claim 6 wherein the decode logic circuit means includes means responsive to predetermined outputs of said frequency divider circuit means for producing a predetermined time duration logic signal having a duration equal to the duration of a predetermined number of bit intervals included in the received address signals, said last named logic signal being applied to said one comparator means to activate said one comparator means only during the duration of said address signals included in said binary coded data word messages.

8. The addressable communication terminal as claimed in claim 7 wherein said one comparator means includes an exclusive-OR gate having two inputs forming said first and second inputs of said address recognition means.

9. The addressable communication terminal as claimed in claim 8 wherein said one comparator means includes a first AND gate responsive to said logic signal produced for said predetermined time duration and to one phase of said plural phase clock signals of said source of clock signals, a second AND gate receiving the output of said first AND gate and the output of said exclusive-OR gate so as to produce a predetermined number of the one phase of said clock signals at the output thereof when said output of said exclusive-OR gate is responsive to matching received and internal address signals at the two inputs thereof, and said one comparator means further includes counter means responsive to said predetermined number of the one phase of said clock signals from said second AND gate to initiate the equality logic signal at the output of said address recognition means.

10. The addressable communication terminal as claimed in claim 9 wherein said one comparator means includes a third AND gate receiving the one phase of said plural phase clock signals, means producing the single bit logic signal to said third AND gate in response to the first bit of said binary coded data word messages so as to produce a single clock signal, flip-flop circuit means receiving the single clock signal output of said third AND gate and the output from said exclusive-OR gate, and a NOR gate means responsive to the output from the counter means and the output from said flip-flop circuit means so as to produce the equality logic signal at the output thereof.

11. The addressable communication terminal as claimed in claim 2 including control circuit means being activated in response to said equality logic signal.

12. The addressable communication terminal as claimed in claim 1 said address recognition means includes second comparator means having an output and first and second inputs, said first input receiving a second of the plural bit streams from said address generator means with the second bit stream having a different binary coded format than said one bit stream so as to define another internal binary address signal and said second input receiving another of said predetermined address signals included in said binary coded data word messages, said output of said second comparator means producing another equality logic signal when said first and second inputs receive matching internal and received address signals whereby the address recognition means is alternately responsive to both of two different binary address signals included in the received messages for concurrently communicating with said predetermined remote location and either of two different groups of other of said remote locations.

13. An addressable communication terminal for each of a plurality of remote locations supplied a quantity from a common distribution network and linked to a central station by a communication system transmitting communication signals including binary coded data word messages having different binary coded address signals and binary coded function signals for selectively communicating with different ones of the remote locations and initiating predetermined operations relating to consumption of said quantity supplied thereto, said addressable communication terminal comprising:

communication receiver means for receiving said communication signals including said binary coded data word messages wherein predetermined binary address signals designate a predetermined one of said remote locations and predetermined binary coded address signals designate desired control and monitoring operations to be effected at the predetermined remote location;

internal address generator means including an output, a source of plural bit streams having different binary coded formats, and said address generator means further including conductor means selectively connecting one of said plural bit streams to said output so that said output produces a coded signal defining an internal address signal corresponding to one of said predetermined binary address signals included in the received binary data word messages;

address recognition means including one comparator means having first and second inputs, said first input receiving said binary address signals of said received binary data word messages and said second input receiving said output of said address generator means, and said one comparator means further including an output for producing an equality logic signal when said first and second inputs receive matching received and internal address signals;

function decoder circuit means responsive to both said equality logic signal and said binary coded function signals to effect an output signal designating a predetermined operation to be performed; and control circuit means responsive to said output signal of said function decoder circuit means to effect at least one of said predetermined operations at said predetermined remote location.

14. The addressable communication terminal as claimed in claim 13 wherein said control circuit means is effective to control the consumption said quantity supplied to said predetermined remote location by said distribution network.

15. The addressable communication terminal as claimed in claim 13 wherein said function decoder circuit means includes plural outputs and is responsive to both said equality logic signal and different binary coded function signals to effect output signals at corresponding different ones of said plural outputs.

16. The addressable communication terminal as claimed in claim 15 including plural control circuit means each receiving separate ones of said plural outputs of said function decoder circuit means for selectively controlling the consumption of said quantity supplied to said predetermined remote location.

17. The addressable communication terminal as claimed in claim 16 wherein said meter data storage means includes plural storage registers and said control circuit means receives plural outputs from said function decoder circuit means to effect separate storage of said digitally encoded meter readings in said plural storage registers for producing time-of-day related meter readings of the consumption of the supplied quantity.

18. The addressable communication terminal as claimed in claim 13 wherein said address recognition means includes second comparator means having an output and first and second inputs, said first input receiving said binary address signals of said received binary data word messages and said second input receiving another of said plural bit streams from said address generator means so as to define another internal binary address signal, said output of said second comparator means producing another equality logic signal when said first and second inputs receive matching received and internal address signals being different from the matching received and internal address signals producing said equality logic signal at said one comparator means, and further wherein said function decoder circuit means is responsive to either of said equality logic signals of said one and second comparator means and said function signals whereby different received binary data word messages are effective to activate said function decoder circuit means and said control circuit means.

19. The addressable communication terminal as claimed in claim 13 including meter means for measuring consumption of said quantity supplied to said predetermined remote location so as to produce digitally encoded meter readings, meter data storage means connected to receive said digitally encoded meter readings, and control circuit means receiving at least one of said outputs from said function decoder circuit means to effect storage of said digitally encoded meter readings in said storage means.

* * * * *